Nov. 14, 1967             M. KROFTA             3,352,420
ARRANGEMENT FOR SUPPLYING AIR UNDER PRESSURE TO WASTE
WATER, MORE PARTICULARLY IN THE PAPER AND
CELLULOSE INDUSTRY, FOR SUBSEQUENT
PURIFICATION BY FLOTATION
Filed June 22, 1965
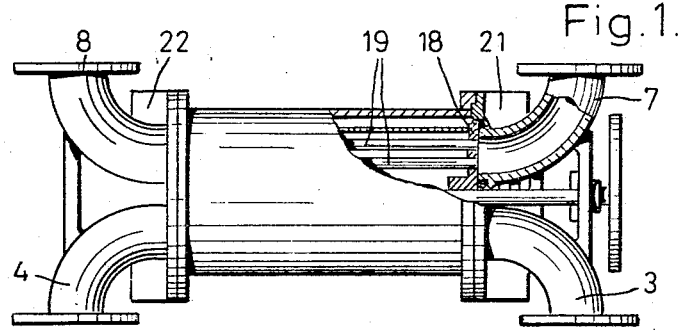
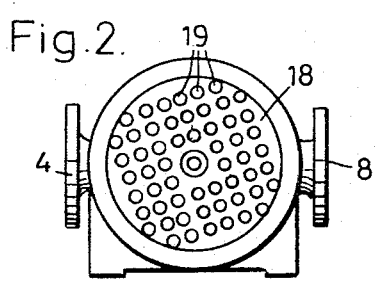
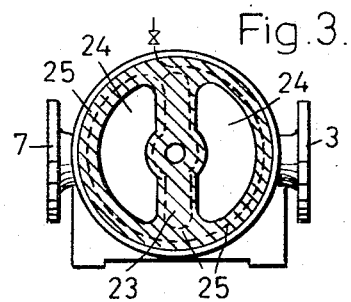
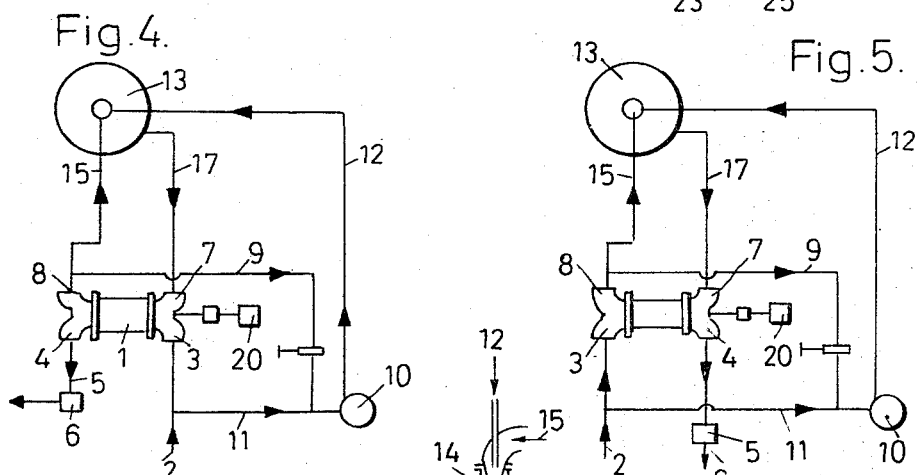
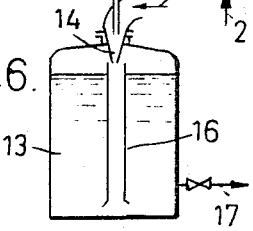
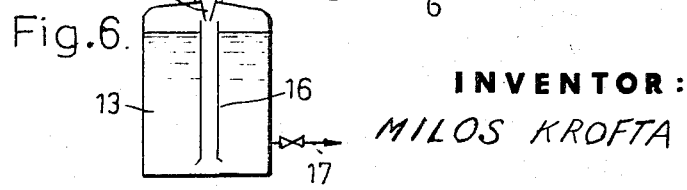
INVENTOR:
MILOS KROFTA
By *Jacob L. Kollin*
Attorney United States Patent Office 3,352,420
Patented Nov. 14, 1967

3,352,420
ARRANGEMENT FOR SUPPLYING AIR UNDER PRESSURE TO WASTE WATER, MORE PARTICULARLY IN THE PAPER AND CELLULOSE INDUSTRY, FOR SUBSEQUENT PURIFICATION BY FLOTATION
Milos Krofta, 58 Yokun Ave., Lenox, Mass. 01240
Filed June 22, 1965, Ser. No. 465,964
2 Claims. (Cl. 210—205)

The invention relates to an arrangement for supplying air under pressure to waste water, more particularly in the paper and cellulose industry, for subsequent purification by flotation.

For clarifying waste water and for recovering materials separated by flotation, it is necessary to supply a sufficiently great amount of air under pressure to the water, and then to expand this air in the flotation clarifier in such a manner that the dissolved air emerges as completely as possible in the form of microscopically small bubbles, the materials to be separated floating up with it, so that the materials can be separated and collected or recovered, whereas the waste water is clarified. In the known flotation clarifiers, it is necessary to bring the entire water amount to a relatively high pressure, for example 4.5 atmospheres, in order to cause a sufficiently great amount of air to dissolve, this requiring high power consumption and being therefore economically expensive.

With the arrangement according to the invention, it is possible to bring the waste water to the required pressure of between 2.5 and 6 atmospheres with essentially lower power consumption and therefore lower expense.

The arrangement according to the invention is characterised by a high pressure circulation which is maintained between a pressure vessel and the high pressure part of an exchanger device, the high pressure circulation being continuously maintained with the aid of a high pressure pump making use of water which is branched off from the waste water current to be purified and which is under low pressure and is supplied with the necessary air and/or flotation means.

The flow direction of the low pressure waste water through the exchanger on the one hand and that of the high pressure waste water through the exchanger on the other hand, may take place in the same or in opposed senses.

The exchanger preferably comprises a drum which is arranged for being driven from the outside thereof by a centrically located shaft. This drum consists of a plurality of pipes which are preferably arranged axially parallel to each other and alongside and one above each other, the pipes being tightly mounted with their ends in two plates which are fixed to the drum axle. These end plates, with the interposition of sealing means, are engaged by two stationary covers which close off the ends of a housing surrounding the drum. These covers in each case carry inlet and outlet connections arranged in such way that the inlet connections of both covers on the one hand, and the outlet connections of both covers on the other hand, are in alignment with each other. At the connection to the drum, these connections form two mutually separated kidney-shaped cross-sections and between the corresponding regions at each end of the drum separate the bundle of pipes of the drum into two separate regions. One region is subjected to high pressure and the other region low pressure. On rotation of the drum with the bundle of pipes, the individual pipes successively pass from one region into the other in such a manner that for example when one pipe is entering the high pressure region an oppositely lying pipe is leaving the high pressure region and entering the low pressure region. Suitable sealing means ensure that the rims of the two kidney-shaped cross-sectional regions of the two covers have a satisfactory sealing action at the places where they engage the pipes of the drum.

In order to make the invention clearly understood, reference will now be made to the accompanying drawings which are given by way of example and in which:

FIG. 1 is a partly sectioned elevation view of a pressure exchanger;

FIG. 2 is an end view of the exchanger, with a cover removed;

FIG. 3 is an end view showing the inner side of a cover;

FIG. 4 is a diagram showing the operation of the exchanger when using a single direction through-flow;

FIG. 5 is a diagram showing the operation of the exchanger when using contra-flow; and FIG. 6 diagrammatically illustrates a pressure vessel.

The structure of the arrangement and the manner of its operation will firstly be explained with reference to FIGS. 4 and 5. The exchanger 1 is arranged in front of a flotation clarifier. From a point at which waste water is collected, the waste water is fed through a low pressure pump (not shown) through a line 2, to the inlet connection 3 of the exchanger 1. Beforehand, a predetermined amount of air is supplied to the waste water to be clarified, for example directly in front of the feed pump or at a region where the flocculating chemicals are supplied. The necessary air can alternatively be injected in the form of compressed air into the supply line of the waste water to be clarified. The waste water leaves the exchanger through the outlet connection 4 and passes through the line 5 and if desired through a friction valve 6 to the flotation clarifier, which is not illustrated. Between the second inlet connection 7 of the exchanger and its second outlet connection 8, a high pressure circuit is provided which has a circulation pipe 9. The high pressure circulation between the connections 7 and 8 is maintained by a small pump 10, which feeds a small partial current of the waste water to be clarified, from the branch line 11 and the supply line 12 into the pressure vessel 13. As FIG. 6 shows, this branch current exerts an injector action with the aid of an inlet nozzle 14, and applies suction to the connection line 15 which extends to the outlet connection 8 of the exchanger, the water flowing through the nozzle 14 being directed into a guide pipe 16 in the pressure vessel 13, the water finally passing through the connection line 17 to the inlet connection 7 of the exchanger. The manners of operation of the arrangements of FIGS. 4 and 5 differ from each other only in that in the first case the low pressure part 2, 3, 4, 5, 6 operates in the same flow direction as the high pressure part 8, 15, 17, 7, whereas in the arrangement of FIG. 5 they operate in contra-flow.

As shown in FIGS. 1 to 3, the exchanger 1 comprises a housing in which a rotating drum is mounted, the drum comprising a plurality of pipes 19 which are arranged alongside and one above the other and which are tightly connected at their ends to end walls 18. The drum is rotated by a motor 20 (FIGS. 4 and 5). The two ends of the drum are embraced or covered by covers 21, 22, which comprise the inlet connections 3 and 7 and the outlet connections 4 and 8. The connections at the two ends have free cross-sections 24 which are of kidney shape, separated from each other by a transverse strip 23, and provide terminations for the pipes 19. The sealing of the pipes relative to the end walls 18 is effected by a sealing tube 25 which is inserted in a channel in the cover end wall and extends in the manner shown in broken lines in FIG. 3, the tube 25 being inflated with air through a valve or other closure means.

The operation of the arrangement is based on the fact that two completely separate flow paths or circulatory systems exist. The low pressure circuit 2, 3, 4, 5, 6, is completely separated from the high pressure circuit 8, 15, 17, 7 by the transverse members 23 of the covers 21 and 22. The high pressure circuit can be visualised as a closed vessel in which water can be brought to a high pressure with minimum force expenditure. The drum with the pipes 19 is rotated in such a manner that before a water particle flows through a pipe, this pipe is moved as a result of rotation of the drum into the high pressure region of the drum. Accordingly, this water particle is forced out of the pipe by high pressure water entering the high pressure part from the inlet connection, and finally leaves the exchanger at the connection 4. Since the high pressure circuit is completely separate from the low pressure circuit, the latter has no influence on the pressure in the pressure vessel 13. The pressure pump 10 has to be so arranged that it can maintain the necessary pressure of about 6 atmospheres in the high pressure circuit, compensating for leaks between the high pressure and low pressure part. The drum with its pipes 19 serves simply as a transport means, and by rotation of the drum as soon as a given pipe has moved out of the low pressure part of the exchanger between the kidney-shaped cross-sections of the connection members 3 and 4 into the high pressure region between the connection members 7 and 8, another pipe moves from the high pressure region into the low pressure region. The pressure action is exerted on the contents of the pipe during the time passing in the high pressure section. Accordingly, the entire waste water amount which passes through the pipes of the exchanger receives the necessary high pressure treatment. Only a very small amount of waste water is pumped to high pressure and this amount represents only about 10% of the total amount of waste water.

What I claim is:

1. An arrangement for dissolving air under pressure into waste water, more particularly for the paper and cellulose industry for a subsequent clarification by flotation comprising, a pressure exchanger, a pressure vessel, and a high pressure pump, said pressure exchanger comprising a drum driven externally thereof by a centrally located drive shaft, said drum including a plurality of pipes arranged axially parallel to each other, a pair of spaced end walls mounted on said shaft and being connected to the ends of said pipes, a housing for said drum including a pair of stationary covers which form closures, sealing means interposed between said end walls and said stationary covers, each cover being provided with a pair of kidney-shaped connections which are in communication with said pipes, means for feeding waste water having dissolved air therein to one of said connections in one of said covers, means communicating with one of said connections in the other of said covers and adapted to be connected to a flotation clarifier, means communicating said pressure vessel with each of the other connections in said covers, means for diverting a portion of the waste water to said high pressure pump, and means providing communication between said pressure vessel and said high pressure pump, the first and second mentioned means in conjunction with said pressure exchanger constituting a closed low pressure circuit, and the third mentioned means in conjunction with the pressure vessel and the pressure exchanger constituting a closed high pressure circuit, the high pressure being maintained by the high pressure pump.

2. An arrangement as claimed in claim 1, wherein said sealing means comprises an inflatable tube inserted in a groove in the cover in the vicinity of the kidney-shaped connections.

No references cited.

REUBEN FRIEDMAN, *Primary Examiner.*

J. DE CESARE, *Assistant Examiner.*